(12) United States Patent
Sala

(10) Patent No.: US 7,152,649 B2
(45) Date of Patent: Dec. 26, 2006

(54) TIRE-ASSEMBLING APPARATUS

(75) Inventor: Adamo Sala, Agrate Brianza (IT)

(73) Assignee: Pirelli Pneumatici S.p.A., Milan (IT)

( * ) Notice: Subject to any disclaimer, the term of this patent is extended or adjusted under 35 U.S.C. 154(b) by 722 days.

(21) Appl. No.: 10/042,184

(22) Filed: Jan. 11, 2002

(65) Prior Publication Data

US 2002/0104620 A1   Aug. 8, 2002

Related U.S. Application Data

(63) Continuation of application No. PCT/EP00/05972, filed on Jun. 27, 2000.

(60) Provisional application No. 60/155,129, filed on Sep. 22, 1999.

(30) Foreign Application Priority Data

Jul. 30, 1999 (EP) .................................. 99830497

(51) Int. Cl.
*B29D 30/24* (2006.01)

(52) U.S. Cl. .................. 156/402; 156/398; 156/415

(58) Field of Classification Search ................ 156/402, 156/398, 415, 414, 417–420
See application file for complete search history.

(56) References Cited

U.S. PATENT DOCUMENTS

| | | | |
|---|---|---|---|
| 3,645,828 A * | 2/1972 | Balle et al. .................. | 156/402 |
| 3,887,423 A | 6/1975 | Gazuit | |
| 3,990,931 A | 11/1976 | Leblond et al. | |
| 4,010,058 A * | 3/1977 | Kubinski et al. ............ | 156/415 |
| 4,131,500 A * | 12/1978 | Wilde et al. ................. | 156/131 |
| 4,138,307 A * | 2/1979 | Rost ........................... | 156/415 |
| 4,362,592 A | 12/1982 | Ruppel | |
| 4,470,867 A | 9/1984 | Caretta et al. | |
| 4,547,251 A * | 10/1985 | Landsness .................. | 156/415 |

FOREIGN PATENT DOCUMENTS

| | | |
|---|---|---|
| EP | 0 081 858 | 6/1983 |
| EP | 0 468 580 | 1/1992 |
| FR | 2.093.180 | 1/1972 |
| FR | 2 372 693 | 6/1978 |
| LU | 63 107 | 8/1971 |
| WO | WO 98/52740 | 11/1998 |

\* cited by examiner

*Primary Examiner*—Geoffrey L. Knable
(74) *Attorney, Agent, or Firm*—Finnegan, Henderson, Farabow, Garrett & Dunner, L.L.P.

(57) ABSTRACT

A tire-assembling apparatus includes an assembling drum, radial-movement devices, and at least one axial-movement actuator. The assembling drum includes first and second halves axially opposed along a geometric axis of the drum. Each of the halves includes a plurality of circumferentially-distributed radial sectors. The radial-movement devices associated with each of the halves selectively translate corresponding radial sectors between a contracted condition and an expanded condition. The at least one axial-movement actuator translates the halves relative to each other between an approaching condition and a spaced-apart condition. Each of the radial sectors includes a holding member and a supporting member. The holding member defines an engagement seat of an annular anchoring structure to a bead-part of a carcass sleeve fitted on the drum. The supporting member is linked, relative to the holding member, in a position axially-internal to the holding member and movable between first and second operating conditions.

34 Claims, 9 Drawing Sheets

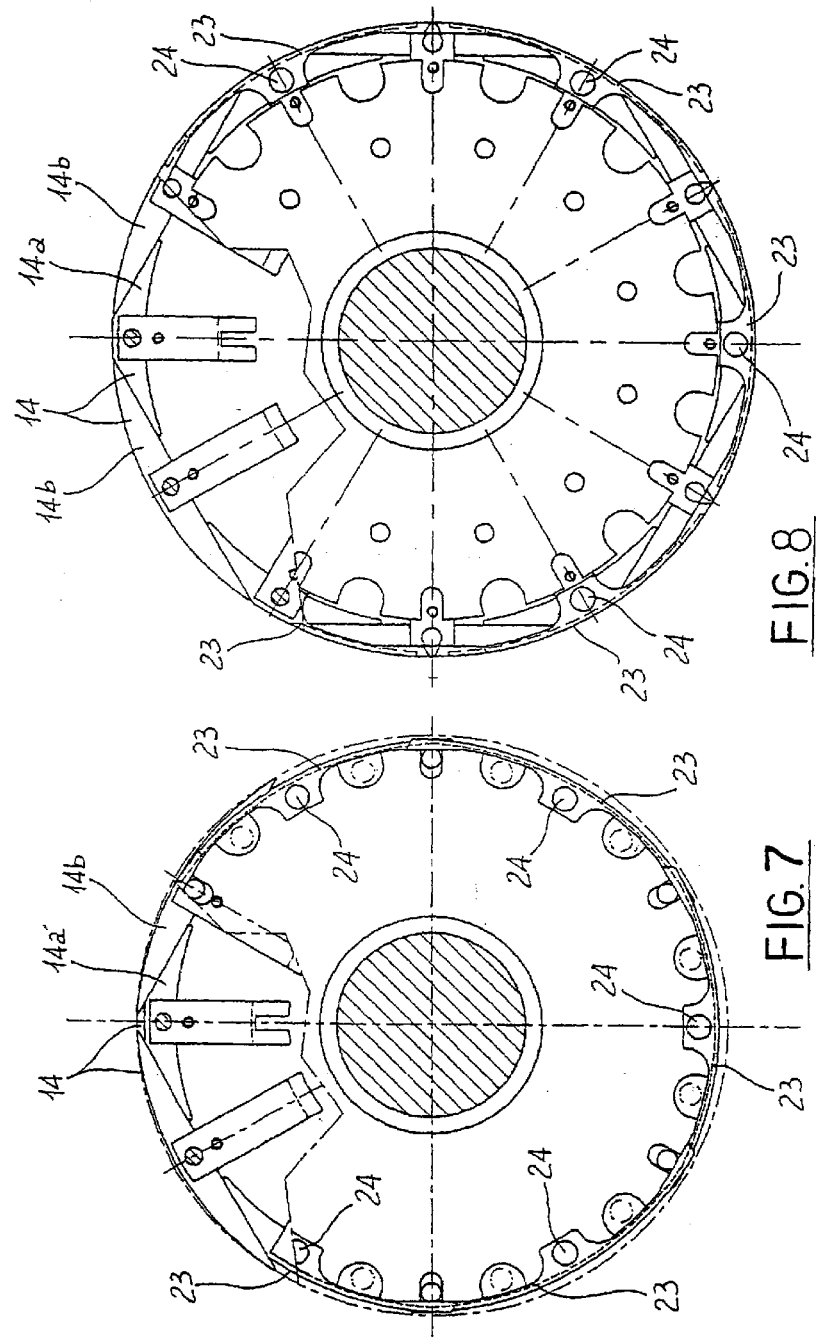

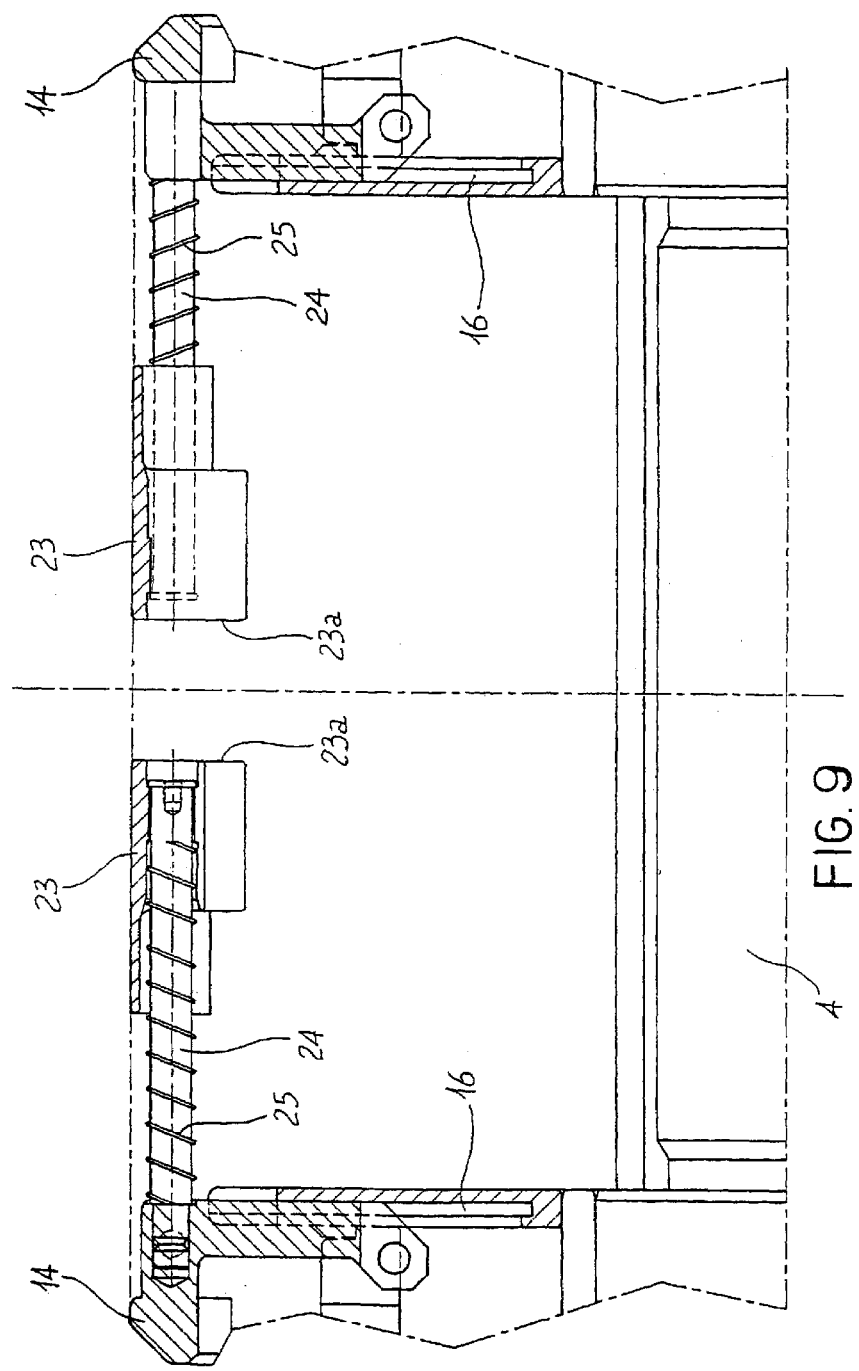

TIRE-ASSEMBLING APPARATUS

CROSS-REFERENCE TO RELATED APPLICATIONS

This application is a continuation application of International Application No. PCT/EP00/05972, filed Jun. 27, 2000, in the European Patent Office, the contents of which are relied upon and incorporated herein by reference; additionally, Applicant claims the right of priority under 35 U.S.C. § 119(a)–(d) based on patent application No. 99830497.6, filed Jul. 30, 1999, in the European Patent Office; further, Applicant claims the benefit under 35 U.S.C. § 119(e) based on prior-filed, copending provisional application No. 60/155,129, filed Sep. 22, 1999, in the U.S. Patent and Trademark Office.

BACKGROUND OF THE INVENTION

1. Field of the Invention

The present invention relates to a tyre assembling apparatus, comprising:
- an assembling drum having first and second halves that are axially opposed along a geometric axis of the drum itself, each of said halves comprising a plurality of circumferentially distributed radial sectors;
- radial-movement devices associated with each of said halves to selectively translate the corresponding sectors between a contracted condition in which they are disposed closer to the geometric axis of the drum and an expanded condition in which they are disposed spaced apart from the geometric axis of the drum;
- at least one axial-movement actuator to translate said halves relative to each other, between a condition in which they are moved close to each other and a condition in which they are moved apart from each other along the geometric axis of the drum.

2. Description of the Related Art

As far as tyre manufacture for vehicle wheels is concerned, a so-called carcass sleeve is provided to be first made, which carcass sleeve is formed by winding up one or more carcass plies on a cylindrical drum.

Fitted on the side edges of the carcass ply or plies disposed in a cylindrical configuration are respective annular anchoring structures, each of them being usually made up of a so-called "bead wire" associated with an elastomer filling and intended for being incorporated into regions usually identified as "beads", formed from a turning-up action carried out on the side edges of the plies around the anchoring structures themselves.

Tyre manufacture also involves formation of a so-called belt package comprising one or more belt layers of textile and/or metallic material, with which a tread band is associated, at a radially outer position thereof. The belt package with the tread band is coaxially disposed around the carcass sleeve, and afterwards the carcass ply or plies are shaped in a toroidal configuration by mutual axial approaching of the tyre beads and simultaneous admission of fluid under pressure to the inside of the carcass sleeve so as to determine application of the belt package and tread band to the tyre carcass structure at a radially outer position thereof.

Several different apparata have been developed and proposed for carrying out the above described operations at least partly.

For example, Italian Patent Application No. 25594 A/81 in the name of the same Applicant, describes an apparatus comprising an assembling drum made up of a plurality of radially expandable sectors to impose such an, expansion to the carcass sleeve that engagement of the bead wires against the carcass plies is caused. Each sector has two side portions that are axially movable relative to a central portion, capable of enabling the cords forming the carcass ply or plies to be conveniently shaped around the radially inner portion of each bead wire. The carcass sleeve thus made lends itself to be transferred to a second assembling drum, where turning up of the side edges of the carcass plies around the annular anchoring structures will be carried out, as well as application of the belt package with the tread band.

In document U.S. Pat. No. 4,362,592 it is provided that the carcass sleeve formed on the assembling drum should have its side edges axially projecting in a cantilevered fashion from the drum side edges. In the proximitty of the opposite sides of the drum is a pair of turning-up devices each comprising a plurality of levers circumferentially distributed around the geometric axis of the drum and movable towards the latter to carry out turning-up of the side edges of the carcass sleeve around the anchoring structures to the beads. In particular, the levers of each turning-up device are axially movable towards the drum starting from a rest condition in which they have an orientation converging towards the geometric axis of the drum itself. In a starting step of the movement, spreading apart of the levers is caused by effect of a guide surface of truncated conical form acting on abutment rollers associated with the levers themselves at a median point of their longitudinal extension. In a second step of the displacement, each lever acts by its free end on the side edge of the sleeve causing turning-up of same. The lever action on the side edge takes place through a spring extending according to a closed line passing through the free ends of all levers. A second spring circumscribing the levers in a median plane of the longitudinal extension of same ensures their coming back to the rest position. The sleeve thus made must be transferred to a further apparatus where application of the belt package and the tread band will be carried out.

Italian Patent Application No. 20467 A/82 in the name of the same Applicant herein mentioned as an example of the most pertinent state of the art, contemplates use of an assembling drum comprising first and second halves to be mutually moved close to each other along the geometric axis of the drum. Each half has respective radially-expandable sectors, each defining a holding member made up of an axially inner portion and an axially outer portion to be moved close to each other in an axial direction to define an engagement seat for the bead wires associated with the carcass sleeve previously formed in another work station.

When engagement has occurred, the first and second halves of the assembling drum are moved close to each other so as to shape the carcass sleeve into a toroidal configuration, concurrently with inflation of air or other fluid thereinto.

In document U.S. Pat. No. 3,887,423 a tyre manufacturing machine is described which has a drum essentially defined by a bladder expandable from a first operating condition, in which it is extended in a substantially cylindrical conformation, to a second operating condition in which it takes a toroidal conformation. A carcass sleeve is fitted on the drum in the first operating condition so that it projects from opposite sides past the drum by its side edges having a slightly smaller diameter than the maximum diameter of the drum itself. Two anchoring structures to the beads are placed on the carcass sleeve close to respective drum shoulders defined at the diametrical narrowing of the side edges of the carcass sleeve.

The side edges of the sleeve are disposed so as to bear on respective elastic tubular membranes within each of which a plurality of circumferentially-distributed levers operates, which levers are axially movable towards the drum to cause turning-up of the respective side edge around the annular anchoring structure, under the action of pressure rollers acting on the inner face of the membrane.

When turning-up is over, the drum and carcass sleeve take a toroidal conformation and the levers are operated again to determine application of the sidewalls previously laid down on the elastic membranes.

U.S. Pat. No. 3,990,931 discloses a tyre assembling drum provided with pairs of pivotable arms journalled each at one end to a respective half of the drum, and joined to each other at a pivoting connection laying in an equatorial plane. The pivotable arms are subjected to radially expand in the region of their mutual linking connection, when the halves approach each other to conform the carcass tyre in a toroidal shape.

SUMMARY OF THE INVENTION

The present invention originates from the Applicant's perception that the present apparata for tyre assembling and related assembling method could be further improved, in particular in connection with the possibility of applying further components such as inserts of textile, metallic and/or elastomer materials to the region of the carcass sleeve included between the annular anchoring structures, which inserts are intended for interacting with the belt package to be associated with the carcass sleeve.

More specifically, application of said components could be carried out by means of devices such structured that they did not interfere with movement of the different drum parts during the step of shaping the carcass sleeve, thereby bringing about advantages on the quality of the finished product and the machinery productivity.

In more detail, the present invention provides a tyre assembling apparatus, wherein each of said sectors comprises: a holding member defining an engagement seat of an annular structure for anchoring to the bead-part of a carcass sleeve fitted on said drum; and a supporting member linked, relative to said holding member, in a position axially internal to the latter and movable between a first operating condition, in which it is axially spaced apart from the holding member to offer a supporting seat to at least one ply being part of said carcass sleeve, and a second operating condition, in which it is disposed close to the holding member to enable mutual approaching of said halves. The supporting members associated with the first and second halves, respectively, have abutment surfaces both facing each other and spaced apart from each other by a smaller amount than the stroke carried out by said halves between their spaced-apart condition and their approaching condition. The respective abutment surfaces of the supporting members abut against each other in the approaching condition.

In a preferential embodiment of the invention, it is advantageously provided that the supporting member should be slidably engaged along at least one guide rod extending in cantilevered fashion from said holding member.

In more detail, it is conveniently provided for the guide rod to extend in parallel to the geometric axis of the assembling drum. In addition, at least one elastic return member may be advantageously provided to be operatively associated with the supporting member to elastically urge it away from the holding member.

For instance, this elastic return member may comprise at least a return spring associated with said guide rod.

Under this circumstance, each of said supporting members is susceptible of being translated towards the respective holding member following a thrust action against at least one of the supporting members associated with the other half during mutual axial approaching of said halves.

Advantageously, the guide rods of the supporting members associated with the first half are angularly offset relative to the guide rods of the supporting members associated with the second half, so as to avoid mutual interferences between the rods themselves when the first and second halves are moved close to each other.

In accordance with a further preferential feature of the present invention, the supporting members associated with each of said halves, under a radially-expanded condition define a substantially continuous cylindrical surface.

For the purpose, it is preferably provided that each of said supporting members should hare end slots slidably housing end projections provided on the circumferentially adjoining supporting members.

In a preferential embodiment, each of said holding members comprises an axially inner portion and an axially outer portion selectively movable, independently of each other, under the action of the radial-movement devices.

The radial-movement devices preferably comprise, for each of the halves of the assembling drum: a supporting hub coaxial with the geometric axis of the drum, slidably engaging the holding members of the respective sectors in a radial direction to said geometric axis; at least one radial-movement actuator operatively in engagement with said supporting hub and axially movable relative thereto; transmission connecting rods each operatively engaged between the radial-movement actuator and the holding member of one of said sectors to give rise to a radial movement of the holding member following an axial movement transmitted by said radial-movement actuator. In more detail, said radial-movement devices may be advantageously provided to comprise, for each of the assembling drum halves: a supporting hub coaxial with the geometric axis of the drum; first guide elements for slidably engaging the axially inner portions of the holding members with the supporting hub, in a radial direction to said geometrical axis; at least one first radial-movement actuator operatively in engagement with said supporting hub and axially movable relative thereto; first transmission connecting rods each operatively engaged between the first radial-movement actuator and one of said axially inner portions to give rise to a radial movement of said one radially inner portion following an axial movement transmitted by said first radial-movement actuator; second guide elements for slidable engagement of the axially outer portions of the holding members with the supporting hub, in a radial direction to said geometric axis; at least one second radial-movement actuator operatively in engagement with said supporting hub and axially movable relative thereto; second transmission connecting rods each operatively engaged between the second radial-movement actuator and one of said axially outer portions to give rise to a radial movement of said one axially outer portion following an axial movement transmitted by said second radial-movement actuator.

It may be also advantageously provided that in the radial sectors of each of said first and second halves, powered axially inner portion operated by said radial-movement devices and driven axially inner portions dragged along in the radial movement of the powered axially inner portions, should be identified.

In accordance with a further aspect of the present invention, at least a turning-up device is advantageously provided to be associated with each of said first and second halves, to turn up a side edge of the carcass sleeve around the respective annular anchoring structure. Advantageously, each turning-up device comprises: a plurality of turning-up levers circumferentially distributed around the geometric axis of the drum, each carrying a pressure element facing the drum; at least one driving member rotatably engaging each of said turning-up levers at a point spaced apart from said pressure element; operation devices to axially translate the driving member between a rest position in which it is axially spaced apart from the radial sectors of the drum and a work position in which it is disposed close to said radial sectors.

In a preferential embodiment, the hinging point of each of said turning-up levers on the driving member has, relative to the geometric axis of the drum, a radial distance smaller than the radial distance measurable on the corresponding pressure element when the driving member is in its rest position.

In addition, the holding member of each sector is advantageously provided to have, at an axially outer position relative to the drum, a lead-in surface converging towards the geometric axis of the drum and facing the pressure element carried by at least one of said turning-up levers.

Preferably, each turning-up device further comprises at least one elastic element extending around the geometric axis of the drum and operating on said turning-up levers to transmit to the latter a radial-thrust action towards the geometric axis of the drum itself.

BRIEF DESCRIPTION OF THE DRAWINGS

Further features and advantages will become more apparent from the detailed description of a preferred but non-exclusive embodiment of a tyre assembling apparatus in accordance with the present invention. This description will be taken hereinafter with reference to the accompanying drawings, given by way of non-limiting example, in which:

FIG. 7 shows, in a partly interrupted diametrical section, the axially inner portions of the holding members of the sectors of one of the drum portions, under a retracted condition;

FIG. 8 shows the axially inner portions of the holding members in an expanded condition;

FIG. 9 shows in an axial section, the supporting portions associated with the radial sectors of the drum, the drum halves being spaced apart from each other;

DETAILED DESCRIPTION OF THE PREFERRED EMBODIMENT

With reference to the cited drawings, a tyre assembling apparatus in accordance with the present invention has been generally identified by reference sign 1.

Figure 1:
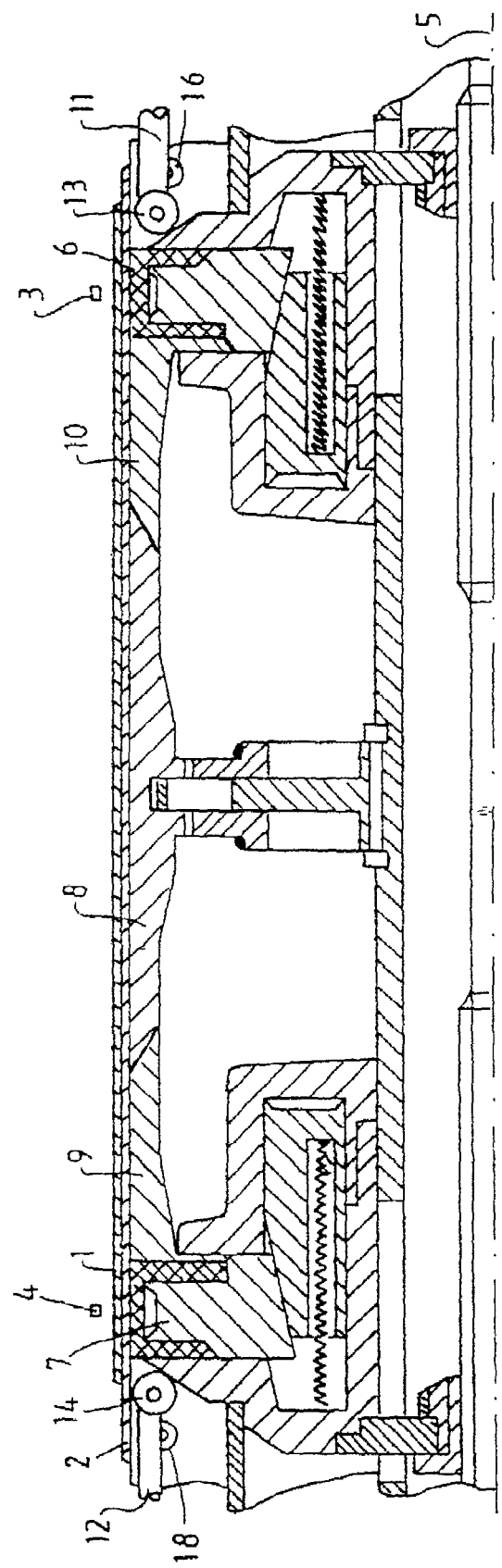
FIG. 1 is an axial half section of the apparatus of the present inventio, under rest conditions.
Figure 2:
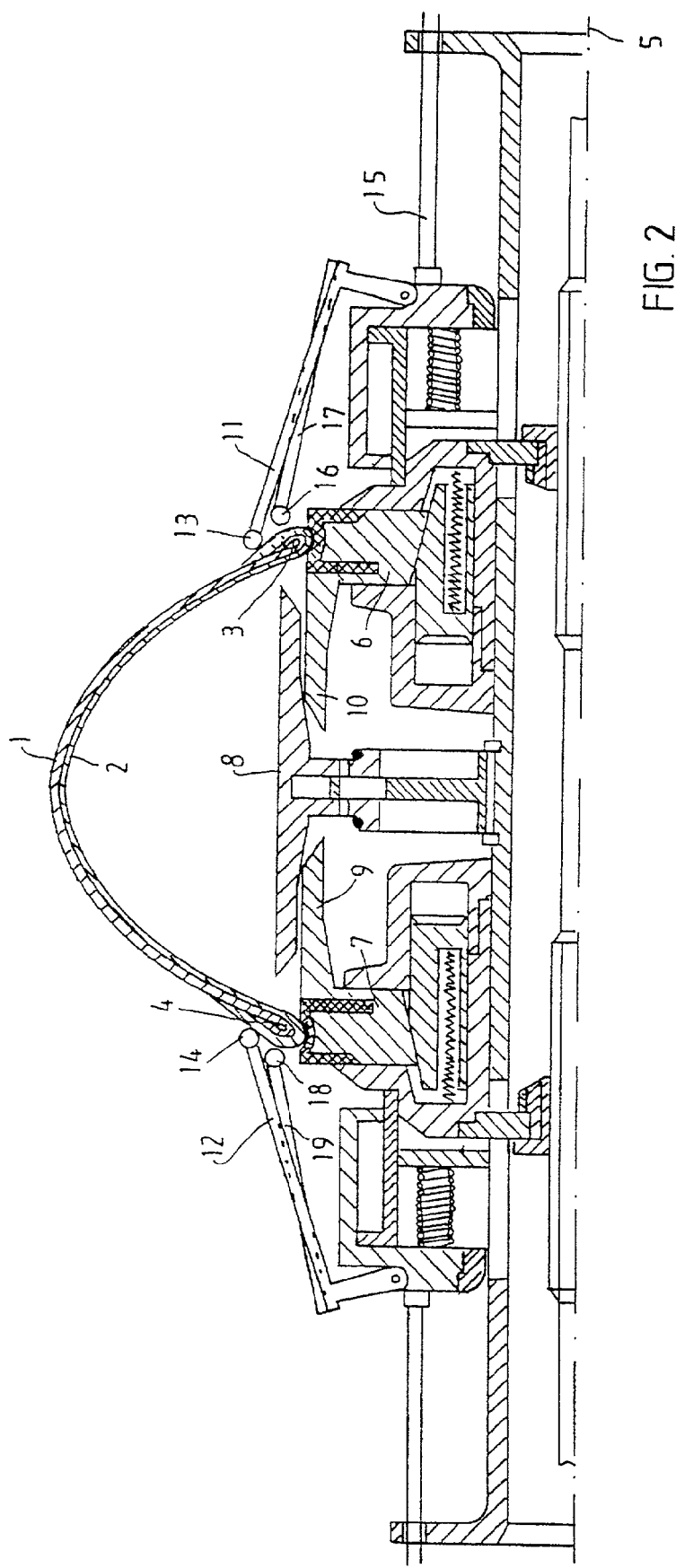
FIG. 2 shows the apparatus of FIG. 1 in an operating condition in which a carcass sleeve has been coaxially fitted onto the assembling drum.
Figure 5:
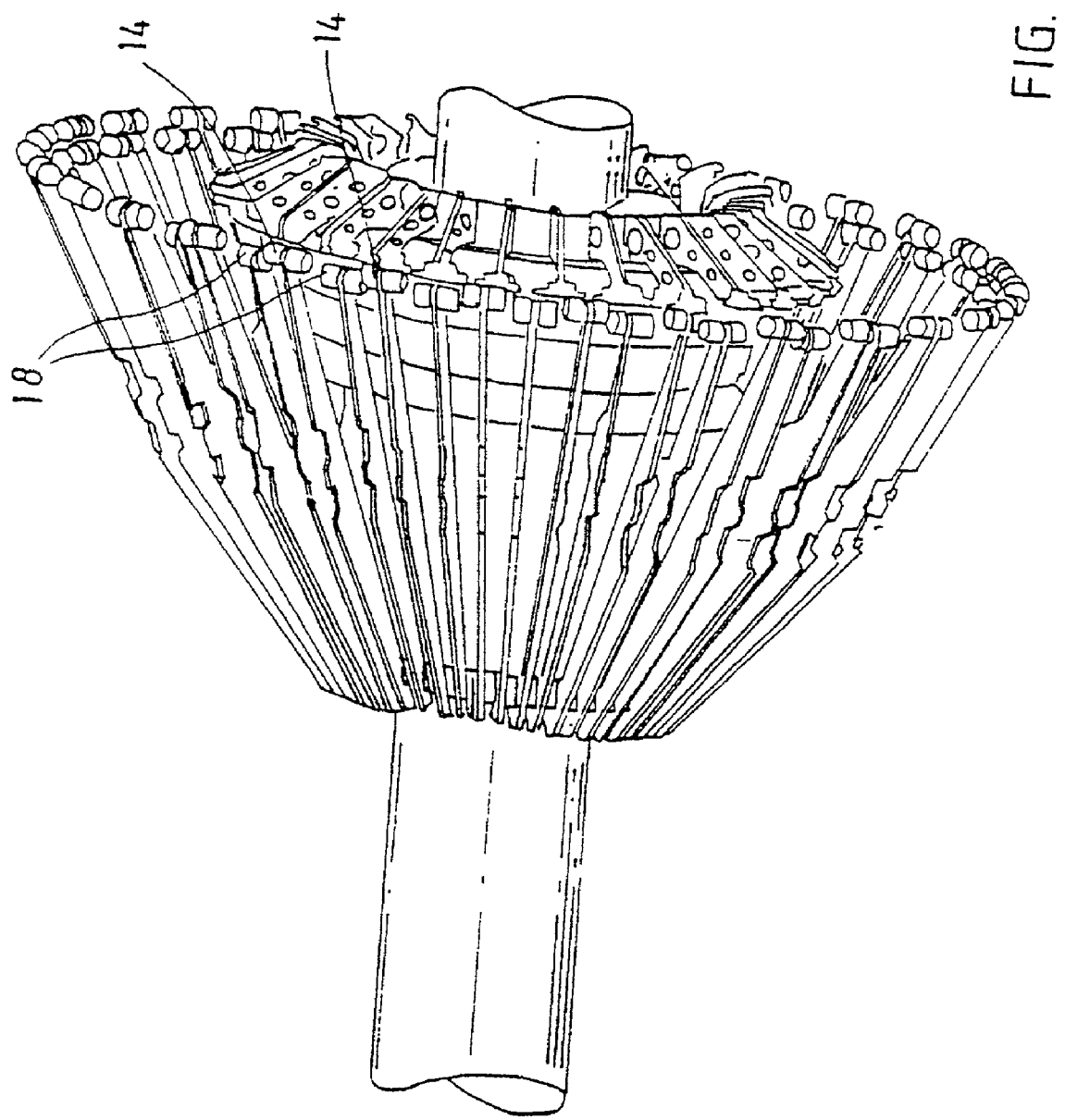
FIG. 5 shows a further operating step in which the carcass sleeve has taken a toroidal conformation, following mutual approach of the anchoring structures to the beads, and coupling between a belt package with a tread band on the carcass sleeve has been carried out.
Figure 6:
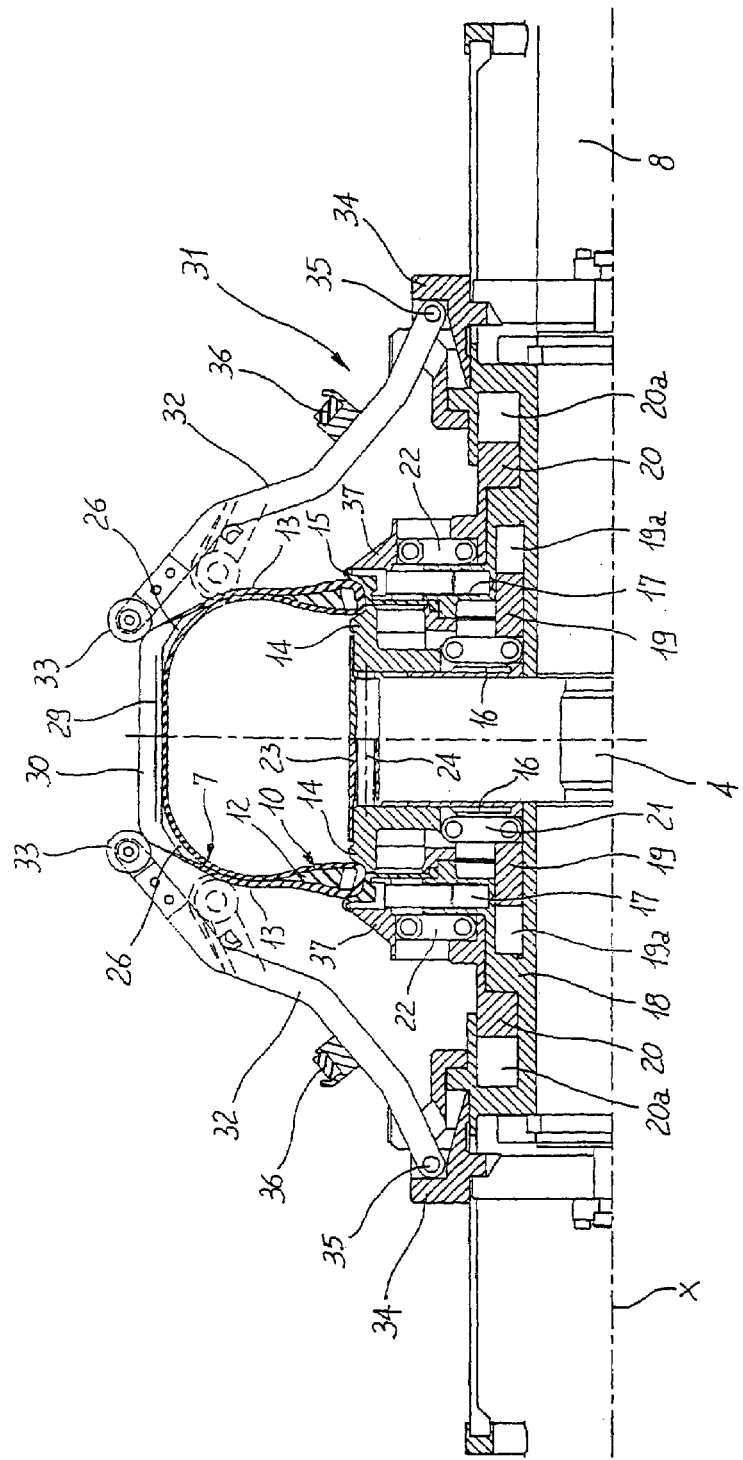
FIG. 6 shows an operating step in which turning-up of the sidewalls and side edges of the carcass sleeve around the annular anchoring structures to the beads is being carried out.
Figure 10:
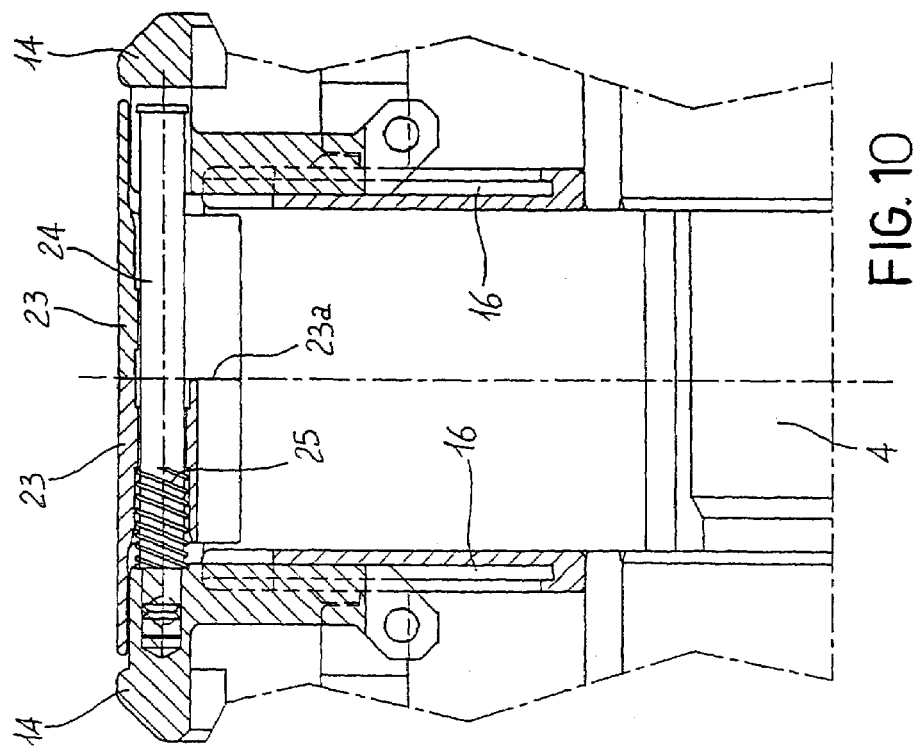
FIG. 10 shows the supporting portions of FIG. 8 with the drum halves in a mutual-approaching condition.

Apparatus 1 comprises an assembling drum 2 having first and second halves 3a, 3b axially opposed along a geometric axis X of the drum itself and susceptible of simultaneous translation, along geometric axis X, between a mutually spaced apart condition, shown in FIGS. 1 and 2 for example, and a mutually approached condition, shown in FIGS. 5 and 6 for example, upon command of at least one axial-movement actuator 4.

Figure 4:
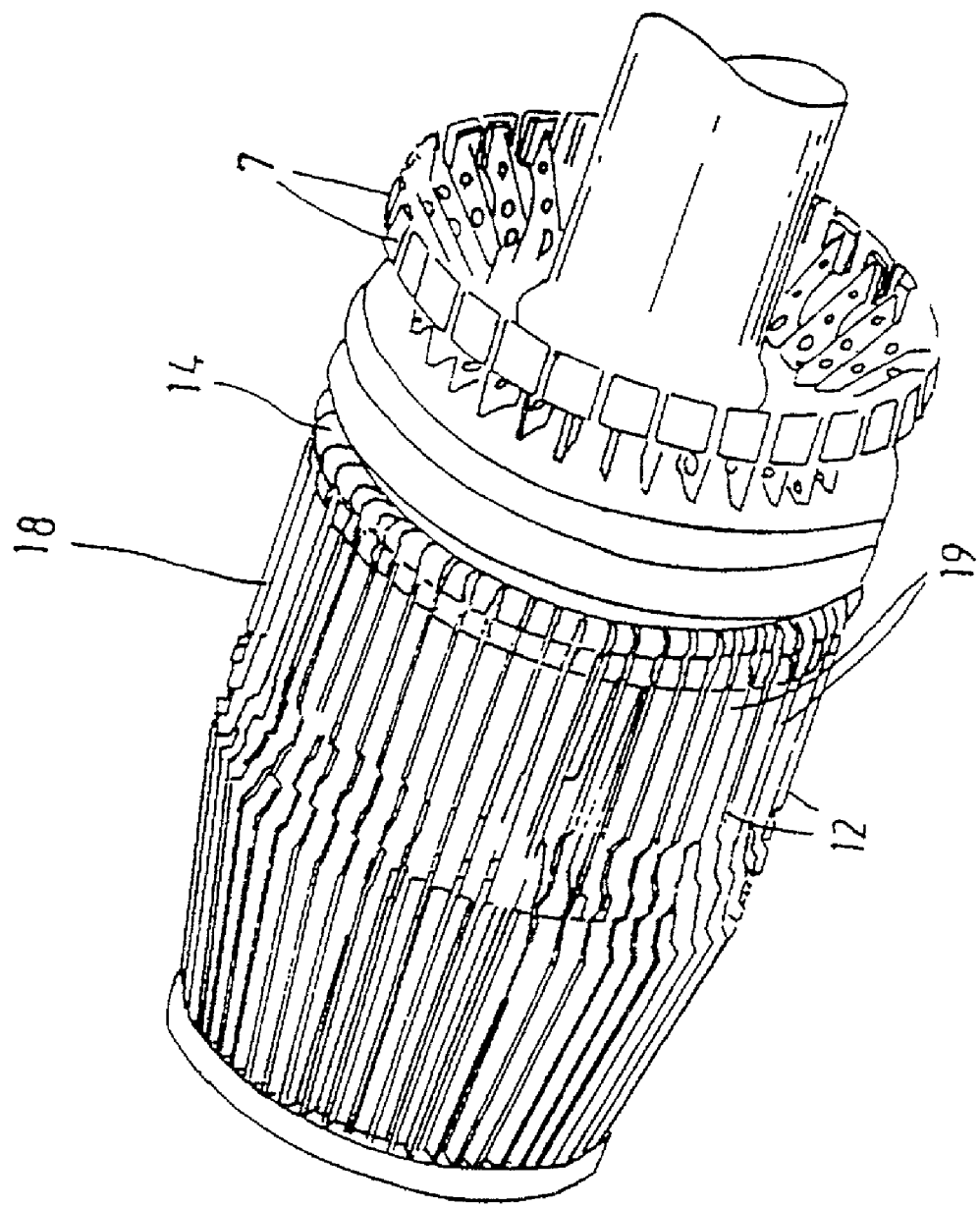
FIG. 4 shows the apparatus in a step subsequent to FIG. 3, in which engagement of the carcass sleeve has been completed, following the radial expansion of the axially outer portions of the drum sectors, and lying down of under-belt strips onto the carcass sleeve has been carried out.

Each of halves 3a, 3b comprises a plurality of radial sectors 5 circumferentially distributed around geometric axis X and susceptible of translation, upon command of radial-movement devices generally denoted by reference sign 6, between a contracted condition in which, as shown in FIG. 1, they are approached to geometric axis X and an expanded condition in which, as shown in FIG. 4 for example, they are radially spaced apart from the geometric axis itself.

Assembling drum 2 is adapted to receive a carcass sleeve 7 previously formed in a cylindrical conformation during a preceding working step. This carcass sleeve 7 may for example comprise one or more carcass plies 9 disposed in a cylindrical conformation, and a pair of anchoring structures to beads 10 each essentially comprising at least one so-called bead wire 11 provided with an elastomer filling 12 at a radially outer position relative to said bead wire 11.

Additional components may be previously applied to the inner surface of carcass ply or plies 9, which components may be for example at least one layer of raw elastomer material, adapted to form a so-called "liner" for example, and extending until close to annular anchoring structures 10, a pair of strips of elastomer material adapted to constitute tyre side walls 13, applied to respective side edges 7a, 7b of sleeve 7, as well as possible textile or metallic reinforcing strips placed at the overlapping region between the liner and each of the above-mentioned side walls.

As shown in FIG. 2, carcass sleeve 7, engaged on the outer surface of a first transfer ring (not shown), technically defined as first-step transfer, can be coaxially fitted on assembling drum 2, supported in cantilevered fashion at a central shaft 8 and such arranged that halves 3a and 3b are mutually spaced apart and radial sectors 5 are in the contracted condition, as shown in FIG. 1.

Figure 3:
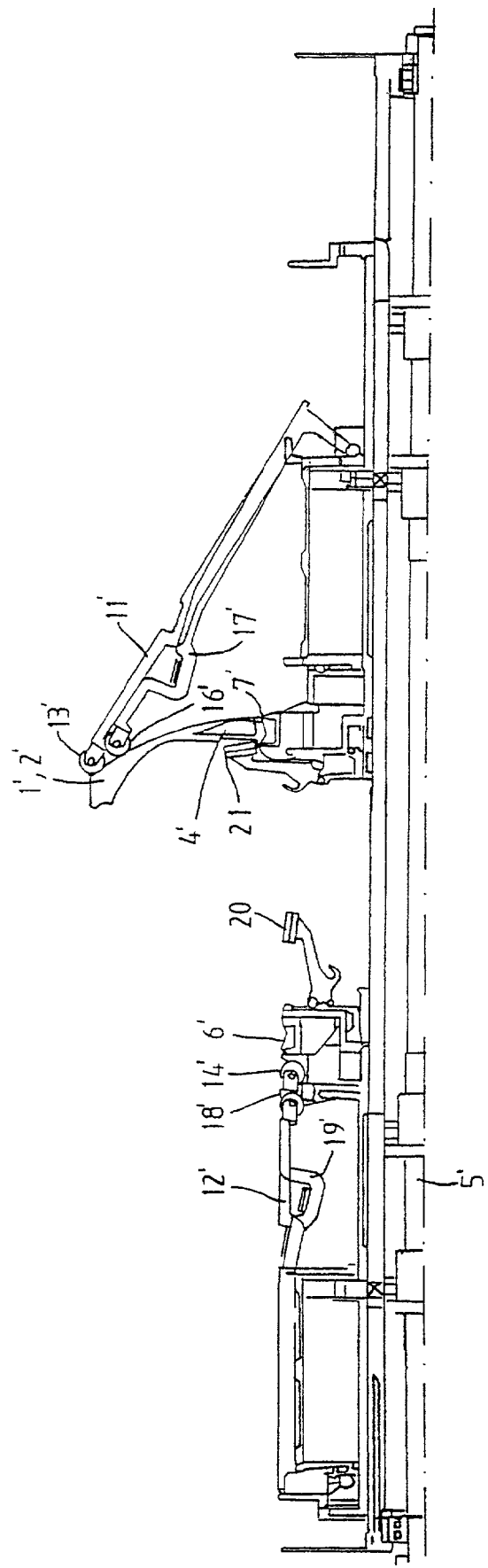
FIG. 3 is a partial section of the apparatus in an operating condition in which the axially inner portions of the holding members being part of the drum sectors have been radially spaced apart to engage the carcass sleeve.

Once positioning of carcass sleeve 7 on assembling drum 9 has been carried out, radial sectors 5 of the latter are brought to the expanded condition to firmly hold the sleeve itself close to annular anchoring structures 10 (FIG. 3).

In more detail, for the purpose it is provided for each radial sector 5 to have a holding member 14, 15 (FIG. 2) defining a seat for engagement of sleeve 7 close to one of annular anchoring structures 10. This holding member 14, 15 preferably comprises an axially inner portion 14 and an axially outer portion 15, selectively movable, independently of each other, under the action of radial-movement devices 6.

For this purpose, radial-movement devices 6 advantageously comprise first and second guide elements 16, 17 (FIG. 2) by means of which axially inner portion 14 and axially outer portion 15 are slidably in engagement, in a direction radial to geometric axis X, with a supporting hub 18 coaxial with the geometric axis itself. Operatively engaged in supporting hub 18 are at least a first and a second radial-movement actuators 19, 20 (FIG. 2), of annular conformation for example, axially movable relative to the hub itself, under the action of a working fluid admitted to respective annular chambers 19a, 20a.

Also provided are first transmission connecting rods 21 each engaged between first radial-movement actuator 19 and one of axially inner portions 14, as well as second transmission connecting rods 22 each engaged between second radial-movement actuator 20 and one of axially outer portions 15. Each of first and second transmission connecting rods 21, 22 lends itself to cause a radial movement of respective axially inner 14 or outer 15 portions, following an axial movement transmitted by first and second radial movement actuators 19, 20, respectively.

It may be advantageously provided that in the plurality of axially inner portions 14 of radial sectors 5 belonging to each of halves 3a and 3b of drum 2, powered axially inner portions and driven axially inner portions following each other in an alternated sequence along the circumferential extension of the drum itself should be identified. Said powered and driven axially inner portions have been denoted by 14a and 14b respectively in FIGS. 1, 7 and 8. As shown in FIG. 1, powered axially inner portions 14a are directly submitted to the action of radial movement devices 6, by means of respective first transmission connecting rods 21, whereas driven axially inner portions 14b are dragged along in the radial movement imposed to operated axially inner portions 14a. The dragging action preferably takes place by means of mutually mating sliding surfaces respectively associated with powered 14a and driven 14b axially inner portions, as clearly shown in FIGS. 7 and 8.

The operating sequence for engaging sleeve 2 by means of holding members 14, 15 first contemplates operation of first radial-movement actuators 19 to cause radial expansion of axially inner portions 14 of each sector 5.

Under this situation, as shown in FIG. 3, radially inner portions 14 engage carcass sleeve 7 close to the axially inner regions of annular anchoring structures 10. It may be provided that the radial expansion of radially inner portions 14 should be followed by a slight mutual moving apart of halves 3, under the action of axial-movement actuator 4, to cause an appropriate tensioning of carcass plies 9 at the section included between annular anchoring structures 10. Next second radial-movement actuators 20 are operated to cause the radial expansion of axially outer portions 15, thereby completing engagement of carcass sleeve 7 by radial sectors 5 close to both annular anchoring structures 10 as shown in FIG. 4. Advantageously, respective supporting members 23 are associated with radial sectors 5, said supporting members being placed at an axially inner position relative to respective holding members 14, 15. These supporting members 23 lend themselves to define, when sectors 5 are in a radial-expansion condition, at least one substantially continuous cylindrical surface so as to provide a supporting seat for carcass ply or plies 9 at the regions included between annular anchoring structures 10.

In more detail, each supporting member 23 is operatively connected to holding member 14, 15 of respective sector 5, and is movable between a first operating condition in which, as shown in FIGS. 1 to 4, it is axially spaced apart from the holding member itself to provide a supporting seat for carcass ply 9, and a second operating condition in which, as shown in FIGS. 5 and 6, it is axially approached to holding member 14, 15 to enable mutual approaching of halves 3a and 3b of drum 2. Preferably, supporting member 23 is slidably engaged along at least one guide rod 24 extending in cantilevered fashion from respective holding member 14, 15, parallelly of geometric axis X of assembling drum 2.

Associated with supporting member 23 is one or more elastic return elements constantly urging member 23 to a condition spaced apart from respective holding member 14, 15. In detail, in the example shown a return spring 25 (only partly illustrated) is provided for the purpose, which spring is coaxially disposed on guide rod 24. The support provided to carcass ply or plies 9 by supporting elements 23 makes it advantageously possible to apply to the region included between annular anchoring structures 10 of carcass sleeve 7, extended in a cylindrical-conformation, one or more additional elements to be integrated into the tyre structure. These additional elements may comprise filling and/or reinforcing ribbon-like elements 26, the so-called "under-belt strips" for example (FIG. 4), intended for being incorporated under the side edges of a belt package, close to the tyre shoulders. In particular, it is possible to carry out application of these ribbon-like elements by a winding action and a simultaneous rolling action around geometric axis X of drum 2, while the latter is being driven in rotation, without the risk that stresses and/or anomalous deformations be produced on the carcass plies.

Figure 11:
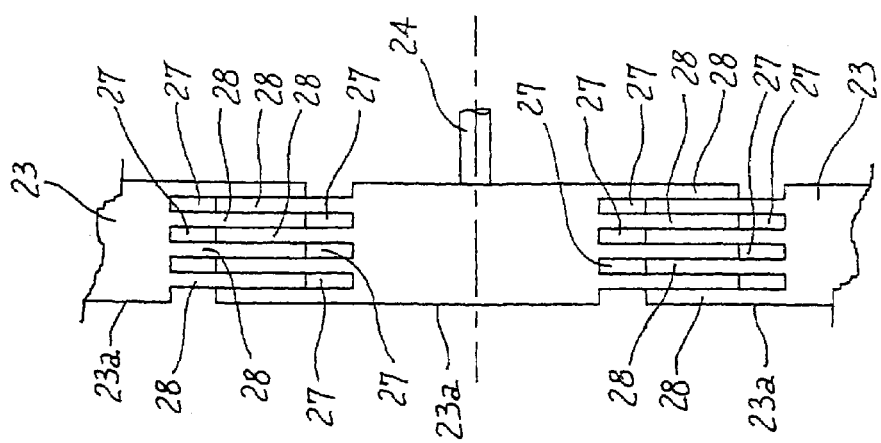
FIG. 11 is an elevational partial view showing the mutual engagement between circumferentially contiguous supporting members being part of the radial sectors of the assembling drum.

In order to provide carcass ply or plies 9 with a supporting surface as much as possible continuous and homogeneous, each of supporting members 23 is advantageously provided with end slots 27 which slidably house end projections 28, mating with said slots and provided on circumferentially contiguous supporting members 23, as clearly shown in FIG. 11.

When application of ribbon-like elements 26 has been completed, assembling drum 2 is moved to a different working station for shaping and completing the tyre carcass structure. During said displacement the toroidal conformation of carcass sleeve 7 begins by mutual approaching of halves 3a and 3b, concurrently with air or other working fluid admission to the inside of carcass sleeve 7, in such a manner that said sleeve takes a toroidal conformation of increasingly growing diameter. Once the sleeve has been positioned in said working station, it receives a so-called belt package 29 coupled with a tread band 30 disposed at a radially outer position of said belt package 29. Belt package 29, comprising one or more belt layers of textile and/or metallic material, and tread band 30 are obtained on a further drum (not shown), in a different station of the manufacturing machine, and positioned on carcass sleeve 7 with the aid of a second transfer ring (not shown) coaxially fitted on the drum. Said further drum and second transfer ring are not described in detail because they are not part of the present invention. Belt package 29 and tread band 30 are positioned at a centered location around carcass sleeve 7 by axial insertion on assembling drum 2 through said second transfer ring provided with grip members acting on the outer surface of the tread band itself. Conformation goes on until the radially outer surface of the carcass sleeve adheres to the radially inner surface of belt package 29 (as shown in FIGS. 5 and 6). At this point the grip members of the second transfer ring are detached from the tread band surface and the transfer ring is moved away.

Supporting members 23, associated with first 3a and second 3b halves respectively, have abutment surfaces 23a facing each other and respectively moved apart from each other by an amount smaller than the stroke carried out by said halves when they translate from their mutually-spaced apart condition to their mutually-approached condition.

Consequently, during translation of halves 3a and 3b towards the mutual-approaching condition, supporting members 23 abut against each other by their respective abutment surfaces 23a. As axial mutual approaching of halves 3a and 3b goes on, each of supporting members 23 moves towards respective holding member 14, 15 and presses spring 25 fitted on guide rod 24, by effect of the thrust action mutually exchanged with one or more of supporting members 23 associated with the other half. Advantageously, guide rods 24 of supporting members 23 associated with first half 3a are angularly offset relative to guide rods 24 of supporting members 23 associated with the other half 3b. In other words, guide rods 24 of supporting members 23 associated with one and the other halves 3a and 3b respectively, are angularly offset relative to each other around geometric axis X. Thus, any possibility of mutual interference between guide rods 24 when halves 3a and 3b are brought into mutual-approaching relationship is eliminated.

In accordance with a further aspect of the present invention, advantageously associated with first 3a and second 3b halves are respective turning-up devices 31, under the action of which side edges 7a, 7b of carcass sleeve 7 are turned up around respective annular anchoring structures 10, and more specifically around bead wires 11 of said structures, to complete tyre manufacturing.

Each turning-up device 31 comprises a plurality of turning-up levers 32 circumferentially distributed around geometric axis X of drum 2. In the accompanying drawings, one turning-up lever alone 32 for each of turning-up devices 31 is shown.

Each turning-up lever 32 substantially lies in a diametrical plane containing geometric axis X and carries, at one free end thereof, at least one pressure element 33, comprising a roller for examples which is turned towards the middle plane of drum 2, the rotation axis of said pressure element 33 being disposed parallelly of said middle plane and perpendicular to said diametrical plane. In more detail, each pressure element 33 is positioned close to one of radial sectors 5, at an axially outer position relative to holding member 14, 15 being part of the sector itself.

Each turning-up device 31 further comprises at least one driving member 34 rotatably engaging each of turning-up levers 32 at a second end thereof or at another hinging point 35 spaced apart from pressure element 33. This driving member 34 can be activated by an operation device comprising a fluid-operated actuator for example, which is coaxially housed in drum 2 and not shown because it can be made in any convenient manner, which actuator causes the driving member to axially translate from a rest position in which, as shown in FIGS. 1 to 5, it is spaced apart from radial sectors 5 belonging to the respective half, and a working position in which, as shown in FIG. 6, it is disposed axially close to said radial sectors.

As clearly shown in FIG. 6, following translation of driving members 34 to the working position, turning-up levers 32 progressively slant while rotating around their hinging points 35, and respective pressure elements 33 cause turning-up of side edges 7a, 7b around anchoring structures 10, radially travelling along tyre side walls 13 away from geometric axis X until they reach tread band 30.

The above-described movement takes place against the action of at least one elastic element 36, consisting of an elastomeric ring for example, extending around geometric axis X and operating on turning-up levers 32 to transmit to said levers a radial thrust action towards the geometric axis itself. Due to the presence of this elastic element 36 a homogeneous thrust action of pressure elements 33 against respective tyre side wall 13 is ensured and a simultaneous movement of the levers themselves during both the going stroke and return stroke to the rest position is promoted.

It is advantageously provided that, when the driving member 34 is at its rest position, turning-up levers 32 preferably extend in the form of a broken line substantially diverging from geometric axis X at radial sectors 5, as shown in FIGS. 1 to 5. Hinging point 35 of each of turning-up levers 32 consequently has a radial distance, relative to geometric axis X, which is smaller than the radial distance measured on corresponding pressure element 33.

It is also preferably provided that radial sectors 5, at an axially outer position, should have respective lead-in surfaces 37 converging towards geometric axis X and facing pressure elements 33. In detail, lead-in surfaces 37 are preferably formed on the axially outer positions of holding members 14, 15 being part of respective radial sectors 5.

Orientation of turning-up levers 32, as well as the presence of lead-in surfaces 37 are favourable for reaching an excellent control on turning-up lever 32 movements, above all at the starting instants of translation of driving members 34 from the rest position. In particular, a slight displacement of the driving members from the rest position can be caused before the step of mutual approaching of halves 3a and 3b of drum 2 begins. Under this situation, pressure elements 33 are brought to a radially outer position relative to lead-in surfaces 37, causing an initial turning-up of side edges 7a, 7b around bead wires 11. Thus, there is eliminated the risk that the cords forming carcass ply or plies 9 may be submitted to undesirable displacements and/or anomalous stresses during the mutual approaching of halves 3a and 3b giving rise to the toroidal conformation of sleeve 7.

The present invention achieves important advantages. In fact, the expedients proposed by the invention enable supporting members 23 to be arranged without the risk that the presence of said members may be a hindrance to a correct movement of each of halves 3a and 3b of drum 2, in particular during the step of mutual approaching of said halves for giving a toroidal conformation to carcass sleeve 7.

It should be also appreciated that, in spite of the presence of supporting members 23, apparatus 1 has a great structural simplicity, which results in advantages in terms of easy servicing and setting.

Moreover, the inclined orientation of turning-up levers 32 at their rest position too, in addition to the above-described advantages, enables the axial sizes of apparatus 2 as a whole to be advantageously reduced. It will be also recognized that since the turning-up levers have the conformation of a broken line, the risk that they may undesirably come into contact with the tyre, above all at the shoulder regions when pressure elements 33 operate on tread band 30, is eliminated, In addition, lead-in surfaces 37 promote the starting contact of pressure elements 33 with the carcass side, enabling said elements to slide along said side in a uniform manner and without discontinuity.

What is claimed is:

1. A tyre-assembling apparatus, comprising:
an assembling drum comprising first and second halves axially opposed along a geometric axis of the drum, each of the halves comprising a plurality of circumferentially-distributed radial sectors;
radial-movement devices associated with each of the halves to selectively translate corresponding radial sectors between a contracted condition, wherein the radial sectors are disposed closer to the geometric axis of the drum, and an expanded condition, wherein the radial sectors are disposed spaced apart from the geometric axis of the drum; and
at least one axial-movement actuator to translate the halves relative to each other between an approaching condition, wherein the halves are close to each other, and a spaced-apart condition, wherein the halves are spaced apart from each other along the geometric axis of the drum;
wherein each of the radial sectors comprises:
a holding member, defining an engagement seat of an annular anchoring structure to a bead-part of a carcass sleeve fitted on the drum;
wherein the holding member comprises an axially-inner portion and an axially-outer portion, movable selectively and independently of each other under action of the radial-movement devices;
a supporting member linked, relative to the holding member, in a position axially-internal to the holding member and movable between a first operating condition, wherein the supporting member is axially-spaced-apart from the holding member to provide a supporting seat to at least one ply that is part of the carcass sleeve, and a second operating condition, wherein the supporting member is disposed axially close to the holding member to enable mutual approaching of the halves;
wherein the supporting members associated with the first and second halves, respectively, have abutment surfaces facing each other that are spaced apart from each other by an amount smaller than a stroke carried out by the halves between the spaced-apart condition and the approaching condition,
and wherein the supporting members abut against each other by respective abutment surfaces in the approaching condition;
a supporting hub coaxial with the geometric axis of the drum;
a first guide element for slidably engaging the axially-inner portions of the holding member with the supporting hub, in a direction radial to the geometrical axis of the drum;
at least one first radial-movement actuator operatively engaged with the supporting hub and axially movable relative thereto;
first transmission connecting rods operatively engaged between the at least one first radial-movement actuator and one of the axially-inner portions to cause a radial movement of the axially-inner portion following an axial movement transmitted by the at least one first radial-movement actuator;
a second guide element for slidably engaging the axially-outer portion of the holding member with the supporting hub, in a direction radial to the geometric axis of the drum;
at least one second radial-movement actuator operatively engaged with the supporting hub and axially movable relative thereto; and
second transmission connecting rods operatively engaged between the at least one second radial-movement actuator and one of the axially-outer portions to cause a radial movement of the axially-outer portion following an axial movement transmitted by the at least one second radial-movement actuator.

2. The apparatus of claim 1, wherein the supporting member is slidably engaged along at least one guide rod extending in cantilevered fashion from the holding member.

3. The apparatus of claim 2, wherein the at least one guide rod extends in parallel to the geometric axis of the drum.

4. The apparatus of claim 1, comprising at least one elastic return member operatively associated with the supporting member to elastically urge the supporting member away from the holding member.

5. The apparatus of claim 2, comprising at least one return spring associated with the at least one guide rod to elastically urge the supporting member away from the holding member.

6. The apparatus of claim 2, wherein the guide rods of the supporting members associated with the first and second halves, respectively, are angularly offset relative to each other.

7. The apparatus of claim 1, wherein each supporting member of the first half may be translated toward a respective holding member due to a thrust action caused by one or more supporting members of the second half during mutual approaching of the halves, and wherein each supporting member of the second half may be translated toward a respective holding member due to a thrust action caused by one or more supporting members of the first half during mutual approaching of the halves.

8. The apparatus of claim 1, wherein the supporting members associated with each of the halves define a substantially-continuous cylindrical supporting surface under a radially-expanded condition.

9. The apparatus of claim 1, wherein each of the supporting members has end slots slidably housing end projections provided on circumferentially-adjoining supporting members.

10. The apparatus of claim 1, wherein the radial-movement devices comprise:
a supporting hub coaxial with the geometric axis of the drum, slidably engaging the holding members of respective radial sectors in a direction radial to the geometric axis of the drum;
at least one radial-movement actuator operatively engaged with the supporting hub and axially movable relative thereto; and
transmission connecting rods operatively engaged between the at least one radial-movement actuator and the holding member of one of the radial sectors to cause a radial movement of the holding member following an axial movement transmitted by the at least one radial-movement actuator.

11. The apparatus of claim 1, wherein the axially-inner portions of the holding members include powered axially-inner portions and driven axially-inner portions, wherein the powered axially-inner portions are operated by respective radial-movement devices, and wherein the driven axially-inner portions are dragged along by the radial movement of the powered axially-inner portions.

12. The apparatus of claim 1, wherein at least one turning-up device is associated with each of the first and second halves to turn up a side edge of the carcass sleeve around a respective annular anchoring structure.

13. The apparatus of claim 12, wherein each turning-up device comprises:

a plurality of turning-up levers circumferentially distributed around the geometric axis of the drum, each carrying at least one pressure element facing the drum;

at least one driving member rotatably engaging each of the turning-up levers at a hinging point spaced apart from the at least one pressure element;

operation devices to axially translate the at least one driving member between a rest position, wherein the driving member is axially-spaced-apart from the radial sectors, and a working position, wherein the driving member is disposed close to the radial sectors.

14. The apparatus of claim 13, wherein the hinging point of each of the turning-up levers has, relative to the geometric axis of the drum, a radial distance smaller than a radial distance measured from a corresponding pressure element when the driving member is in a rest position.

15. The apparatus of claim 13, wherein the holding member of each radial sector has, at an axially-outer position, a lead-in surface converging towards the geometric axis of the drum and facing the pressure element carried by at least one of the turning-up levers.

16. The apparatus of claim 13, wherein each turning-up device comprises at least one elastic element extending around the geometric axis of the drum and operating on the turning-up levers to transmit to the turning-up levers a radial-thrust action toward the geometric axis of the drum.

17. A tyre-assembling apparatus, comprising:

an assembling drum comprising first and second halves axially opposed along a geometric axis of the drum, each of the halves comprising a plurality of circumferentially-distributed radial sectors;

radial-movement devices associated with each of the halves to selectively translate corresponding radial sectors between a contracted condition, wherein the radial sectors are disposed closer to the geometric axis of the drum, and an expanded condition, wherein the radial sectors are disposed spaced apart from the geometric axis of the drum; and at least one axial-movement actuator to translate the halves relative to each other between an approaching condition, wherein the halves are close to each other, and a spaced-apart condition, wherein the halves are spaced apart from each other along the geometric axis of the drum;

wherein each of the radial sectors comprises:

a holding member, defining an engagement seat of an annular anchoring structure to a bead-part of a carcass sleeve fitted on the drum; and a supporting member linked, relative to the holding member, in a position axially-internal to the holding member and movable between a first operating condition, wherein the supporting member is axially-spaced-apart from the holding member to provide a supporting seat to at least one ply that is part of the carcass sleeve, and a second operating condition, wherein the supporting member is disposed axially close to the holding member to enable mutual approaching of the halves;

wherein the supporting members associated with the first and second halves, respectively, have abutment surfaces facing each other that are spaced apart from each other by an amount smaller than a stroke carried out by the halves between the spaced-apart condition and the approaching condition, and wherein the supporting members abut against each other by respective abutment surfaces, during translation of the first and second halves towards the approaching condition and in the approaching condition.

18. The apparatus of claim 17, wherein the supporting member is slidably engaged along at least one guide rod extending in cantilevered fashion from the holding member.

19. The apparatus of claim 18, wherein the at least one guide rod extends in parallel to the geometric axis of the drum.

20. The apparatus of claim 17, comprising at least one elastic return member operatively associated with the supporting member to elastically urge the supporting member away from the holding member.

21. The apparatus of claim 18, comprising at least one return spring associated with the at least one guide rod to elastically urge the supporting member away from the holding member.

22. The apparatus of claim 18, wherein the guide rods of the supporting members associated with the first and second halves, respectively, are angularly offset relative to each other.

23. The apparatus of claim 17, wherein each supporting member of the first half may be translated toward a respective holding member due to a thrust action caused by one or more supporting members of the second half during mutual approaching of the halves, and wherein each supporting member of the second half may be translated toward a respective holding member due to a thrust action caused by one or more supporting members of the first half during mutual approaching of the halves.

24. The apparatus of claim 17, wherein the supporting members associated with each of the halves define a substantially-continuous cylindrical supporting surface under a radially-expanded condition.

25. The apparatus of claim 17, wherein each of the supporting members has end slots slidably housing end projections provided on circumferentially-adjoining supporting members.

26. The apparatus of claim 17, wherein each of the holding members comprises an axially-inner portion and an axially-outer portion, movable selectively and independently of each other under action of the radial-movement devices.

27. The apparatus of claim 17, wherein the radial-movement devices comprise:

a supporting hub coaxial with the geometric axis of the drum, slidably engaging the holding members of respective radial sectors in a direction radial to the geometric axis of the drum;

at least one radial-movement actuator operatively engaged with the supporting hub and axially movable relative thereto; and transmission connecting rods operatively engaged between the at least one radial-movement actuator and the holding member of one of the radial sectors to cause a radial movement of the holding member following an axial movement transmitted by the at least one radial-movement actuator.

28. The apparatus of claim 26, wherein the radial-movement devices comprise:

a supporting hub coaxial with the geometric axis of the drum;

first guide elements for slidably engaging the axially-inner portions of the holding members with the supporting hub, in a direction radial to the geometrical axis of the drum;

at least one first radial-movement actuator operatively engaged with the supporting hub and axially movable relative thereto;

first transmission connecting rods operatively engaged between the at least one first radial-movement actuator and one of the axially-inner portions to cause a radial movement of the axially-inner portion following an axial movement transmitted by the at least one first radial-movement actuator;

second guide elements for slidable engaging the axially-outer portions of the holding members with the supporting hub, in a direction radial to the geometric axis of the drum;

at least one second radial-movement actuator operatively engaged with the supporting hub and axially movable relative thereto; and second transmission connecting rods operatively engaged between the at least one second radial-movement actuator and one of the axially-outer portions to cause a radial movement of the axially-outer portion following an axial movement transmitted by the at least one second radial-movement actuator.

29. The apparatus of claim 28, wherein the axially-inner portions of the holding members include powered axially-inner portions and driven axially-inner portions, wherein the powered axially-inner portions are operated by respective radial-movement devices, and wherein the driven axially-inner portions are dragged along by the radial movement of the powered axially-inner portions.

30. The apparatus of claim 17, wherein at least one turning-up device is associated with each of the first and second halves to turn up a side edge of the carcass sleeve around a respective annular anchoring structure.

31. The apparatus of claim 30, wherein each turning-up device comprises:

a plurality of turning-up levers circumferentially distributed around the geometric axis of the drum, each carrying at least one pressure element facing the drum;

at least one driving member rotatably engaging each of the turning-up levers at a hinging point spaced apart from the at least one pressure element;

operation devices to axially translate the at least one driving member between a rest position, wherein the driving member is axially-spaced-apart from the radial sectors, and a working position, wherein the driving member is disposed close to the radial sectors.

32. The apparatus of claim 31, wherein the hinging point of each of the turning-up levers has, relative to the geometric axis of the drum, a radial distance smaller than a radial distance measured from a corresponding pressure element when the driving member is in a rest position.

33. The apparatus of claim 31, wherein the holding member of each radial sector has, at an axially-outer position, a lead-in surface converging towards the geometric axis of the drum and facing the pressure element carried by at least one of the turning-up levers.

34. The apparatus of claim 31, wherein each turning-up device comprises at least one elastic element extending around the geometric axis of the drum and operating on the turning-up levers to transmit to the turning-up levers a radial-thrust action toward the geometric axis of the drum.

* * * * *